(12) United States Patent
Young

(10) Patent No.: US 12,069,443 B2
(45) Date of Patent: Aug. 20, 2024

(54) VEHICLE INTERCOM SYSTEM

(71) Applicant: Horace Young, Simpsonville, SC (US)

(72) Inventor: Horace Young, Simpsonville, SC (US)

( * ) Notice: Subject to any disclaimer, the term of this patent is extended or adjusted under 35 U.S.C. 154(b) by 56 days.

(21) Appl. No.: 17/385,485

(22) Filed: Jul. 26, 2021

(65) Prior Publication Data

US 2022/0030368 A1    Jan. 27, 2022

Related U.S. Application Data

(60) Provisional application No. 63/056,965, filed on Jul. 27, 2020.

(51) Int. Cl.
*H04R 27/00* (2006.01)
*B60Q 9/00* (2006.01)
*B60R 11/02* (2006.01)
*B60R 11/00* (2006.01)

(52) U.S. Cl.
CPC ............... *H04R 27/00* (2013.01); *B60Q 9/00* (2013.01); *B60R 11/0217* (2013.01); *B60R 11/0247* (2013.01); *B60R 2011/0003* (2013.01); *B60R 2011/004* (2013.01); *B60R 2011/0071* (2013.01); *B60R 2011/0077* (2013.01)

(58) Field of Classification Search
None
See application file for complete search history.

(56) References Cited

U.S. PATENT DOCUMENTS

| | | | |
|---|---|---|---|
| 5,917,920 A | 6/1999 | Humphries | |
| 6,848,816 B2* | 2/2005 | Gilbert | B60Q 1/2665 |
| | | | 362/494 |
| 6,888,934 B2 | 5/2005 | Bell | |
| 7,165,853 B2* | 1/2007 | Gilbert | B60R 1/1207 |
| | | | 359/881 |
| 8,479,960 B2* | 7/2013 | Lopez-Apodaca | |
| | | | B60R 11/0241 |
| | | | 224/679 |
| 10,708,700 B1* | 7/2020 | Salter | H04R 1/025 |
| 10,962,169 B1* | 3/2021 | White | F16M 13/04 |
| 2001/0026623 A1 | 10/2001 | Erwin | |
| 2005/0041819 A1 | 2/2005 | Brown | |
| 2008/0273715 A1 | 11/2008 | Snider et al. | |
| 2009/0290723 A1* | 11/2009 | Lindley | H04B 1/3822 |
| | | | 381/86 |

(Continued)

*Primary Examiner* — Paul W Huber
(74) *Attorney, Agent, or Firm* — Boudwin Intellectual Property Law, LLC; Daniel Boudwin

(57) ABSTRACT

A vehicle intercom system is provided. The system includes one or more housings. Each housing includes a speaker, a microphone, and a lighting element. At least one housing is secured to the exterior of a vehicle via a fastener. In one embodiment, the exterior housing is adjacent to the vehicle mirrors. At least one housing is securable within the vehicle's cabin via a fastener. The speakers are operably connected to the microphone. The one or more housings are in wireless communication with one another and all housings are in wireless communication with an actuator. The actuator is securable to an internal surface of the vehicle cabin. The actuator is configured to activate the speaker and the microphone on each housing to enable two-way audible communication, allowing the driver or passengers to easily communicate with individuals located outside of the vehicle.

10 Claims, 4 Drawing Sheets

(56) References Cited

U.S. PATENT DOCUMENTS

| | | | |
|---|---|---|---|
| 2010/0161177 A1* | 6/2010 | Yuter | B60J 3/02 |
| | | | 296/97.2 |
| 2011/0096817 A1* | 4/2011 | Nassimi | H04L 1/04 |
| | | | 375/219 |
| 2015/0010186 A1* | 1/2015 | Larsen | H04R 1/32 |
| | | | 381/332 |
| 2018/0361937 A1* | 12/2018 | Schmahl | H04W 4/40 |
| 2020/0396553 A1* | 12/2020 | Van Wiemeersch | G06V 40/12 |

* cited by examiner

VEHICLE INTERCOM SYSTEM

CROSS REFERENCE TO RELATED APPLICATIONS

This application claims the benefit of U.S. Provisional Application No. 63/056,965 filed on Jul. 27, 2020. The above identified patent application is herein incorporated by reference in its entirety to provide continuity of disclosure.

BACKGROUND OF THE INVENTION

The present invention relates to a vehicle intercom system. More specifically, the present invention provides a vehicle intercom system that allows a driver to communicate with an individual that is outside the vehicle without rolling down the window or opening the door of the vehicle.

When traveling in a vehicle, drivers commonly have their windows rolled up. When there is an individual standing on the outside of the vehicle a driver will have difficulty properly communicating with the individual because the sound waves are unable to travel through the window or the door of the vehicle. For ride-share drivers, delivery drivers, or even individuals that are in a drive-thru they will have to communicate with someone that is outside their vehicle. In such situations, the driver would be required to roll their window down or open their driver-side door to be able to effectively communicate with the individual. Rolling their window down or opening their car door may leave the driver exposed to both inclement weather and infectious airborne diseases.

A driver rolling down their window during different weather situations can cause damage to the interior of their vehicle and even disturb the internal temperature of the vehicle. Specifically, if a liquid were to get on certain interior fabric, that fabric may get ruined. Thus, having to roll their window down during rain or snow can leave the interior fabric of the vehicle susceptible to potential damage. To repair the damage left by the weather, the driver might have to purchase expensive cleaning material or even pay high prices for a detailing on the vehicle. Moreover, the driver themselves might also get wet from rolling down their window during inclement weather. This could potentially leave the driver vulnerable to illnesses. Additionally, during the extremely cold and hot temperatures, the driver will want to maintain a comfortable temperature within the vehicle cabin. When they have to roll down their window or open their door to communicate with an individual outside the vehicle, they can disturbed the internal temperature of the vehicle an leave the driver and their passengers uncomfortable until they are able to correct the internal temperature.

There are instances where a highly contagious disease can be easily contracted through face-to-face communication. If the disease is airborne transmittable, a driver and an individual outside the vehicle could leave themselves vulnerable to contracting the disease when communicating with the vehicle window rolled down. In such instances, many drivers would feel more comfortable interacting with others from behind the safety of their window. This will lower the risk of transmission of the disease.

Moreover, some driver possesses feelings of high anxiety when they have to speak to someone outside their car. Specifically, drivers may feel uncomfortable lowering the window to speak to strangers. It is common for strangers to approach a vehicle unannounced asking for directions, food, or money. The driver's anxiety comes from the possibility that the stranger could potentially threaten or attempt to harm the driver or their passengers. With risks of assault, car-jacking, and other violent altercations, drivers will lower the chances they are harmed or injured if they can communicate without leaving themselves exposed to such threats by rolling down their window. Additionally, drivers can have increased anxiety when they are pulled over by a law enforcement officer. The anxiety could heighten the tension in the traffic stops which could lead to a possible altercation. If the driver can communicate with the law enforcement officer without lowering their window, they could reduce the anxiety they might feel and have a conversation with the law enforcement officer with a reduced chance of an altercation.

Therefore, there is a defined need amongst the known prior art references for a vehicle intercom system that allows a driver to communicate with an individual outside the vehicle without rolling down their window or opening their door.

SUMMARY OF THE INVENTION

In view of the foregoing disadvantages inherent in the known types of vehicle intercom systems now present in the known art, the present invention provides a new vehicle intercom system wherein a driver can have two-way communication with an individual outside the vehicle via one or more speakers secured adjacently to the vehicle's exterior mirrors.

The present system comprises one or more housings that include an integrated a speaker and a microphone. The one or more housings are in wireless communication with one another to allow for users to communicate through the intercom system. Users can place a first housing within the cabin of the vehicle and a second housing may be secured to the exterior section of the vehicle. Specifically, the second housing may be secured adjacent to the vehicle's exterior mirrors. This configuration will allow the driver of the vehicle to speak and listen to an individual that is outside their car. The intercom system will eliminate the need to roll down the vehicle window or open the car door for the two parties to effectively communicate. Furthermore, using the intercom system will allow for real-time communication with no impediments to the users' ability to hear the other party.

Another aspect of the present system is for the channels of communication between the one or more housings to selectively open by the driver of the vehicle. An actuator is in wireless communication with the one or more housings. The actuator allows the driver to selectively activate the one or more housings from inside the vehicle cabin. The actuator includes a fastener, whereby the actuator may be secured to an interior surface of the vehicle. This will give the driver access to quickly activate the speaker and the microphone on each housing.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout, FIG. 1A shows a perspective view of an embodiment of the internal housing.

DETAILED DESCRIPTION OF THE INVENTION

Figure 1A:
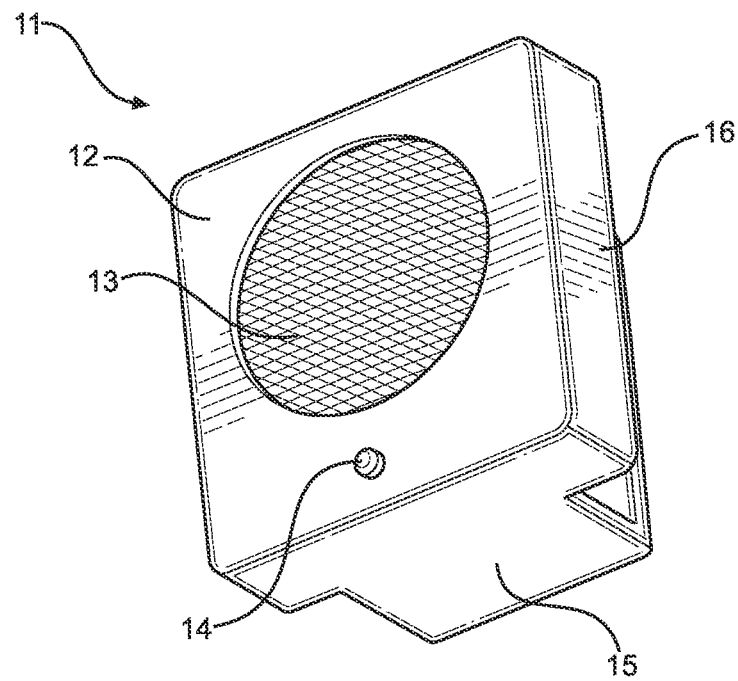
FIG. 1B shows a side view of an embodiment of the internal housing.

Reference is made herein to the attached drawings. Like reference numerals are used throughout the drawings to depict like or similar elements of the vehicle intercom system. The figures are intended for representative purposes only and should not be limiting in any respect.

FIG. 1A shows a perspective view of an embodiment of an internal housing. The internal housing 11 includes a body 12 and a fastener 16. The body 12 comprises a front face, a rear face, and a plurality of side faces. A speaker 13 is disposed on the front face of the body 12. A microphone is integrated with the speaker 13. A lighting element 14 is disposed on the front face of the body 12. The lighting element 14 indicates that the speaker 13 and the integrated microphone are activated. In one embodiment the lighting element 14 is a LED. The fastener 16 is affixed to the rear face of the body 12 via an extending member 15.

Figure 1B:
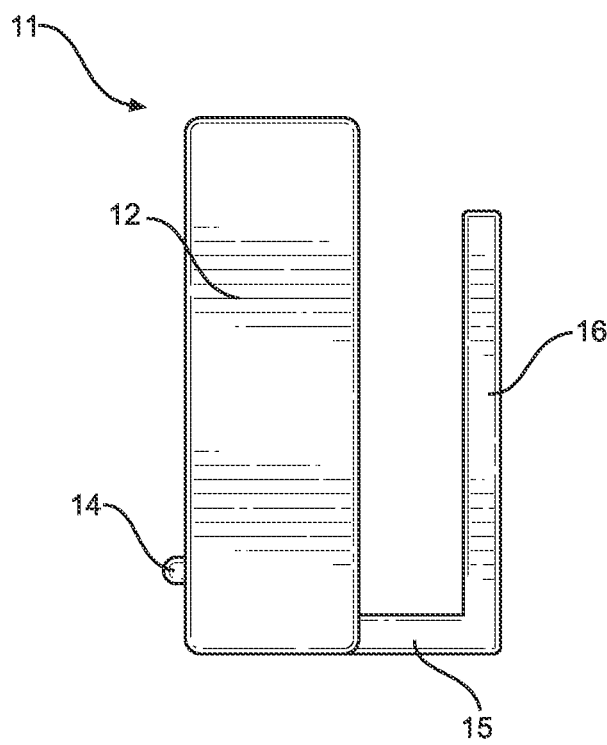

FIG. 1B shows a side view f an embodiment of an internal housing. The internal housing 11 has the extending member 15 extending outwardly from the rear face of the body 12. On this distal end of the extending member 15, the fastener 16 extends upwardly thereon. The fastener 16 will be parallel with the body 12. In the shown embodiment, the fastener 16 forms a clip. Whereby the clip may engage a vehicle's interior object, to secure the internal housing 11 thereon.

Figure 2A:
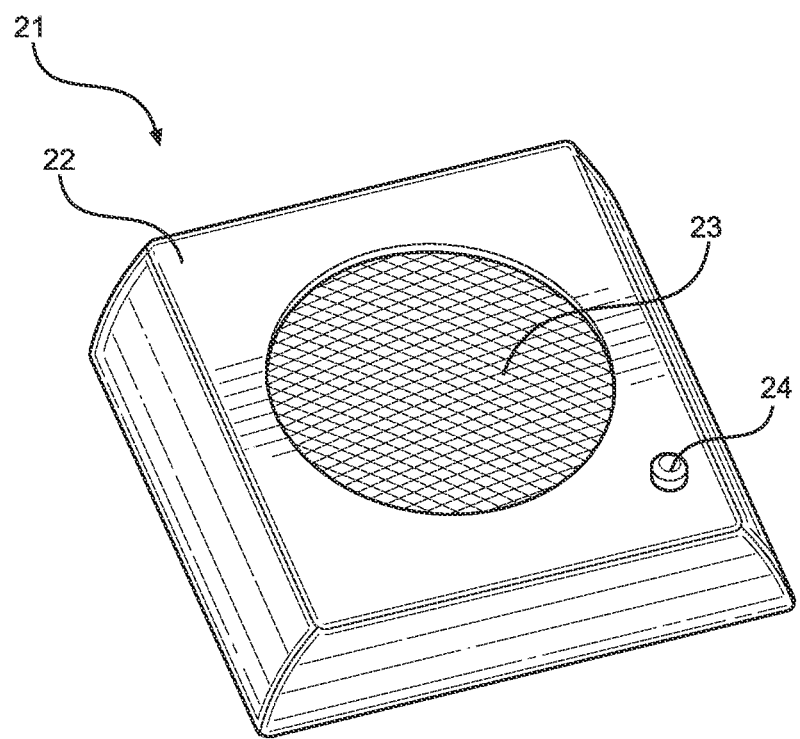
FIG. 2A shows a perspective view of an embodiment of the external housing.

FIG. 2A shows a perspective view of an embodiment of an external housing. The external housing 21 includes a body 22 and a fastener. The body 22 comprises a front face, a rear face, and a plurality of side faces. A speaker 23 is disposed on the front face of the body 22. A microphone is integrated with the speaker 23. A lighting element 24 is disposed on the front face of the body 22. The lighting element 24 indicates that the speaker 23 and the integrated microphone are activated. In one embodiment the lighting element 24 is a LED.

Figure 2B:
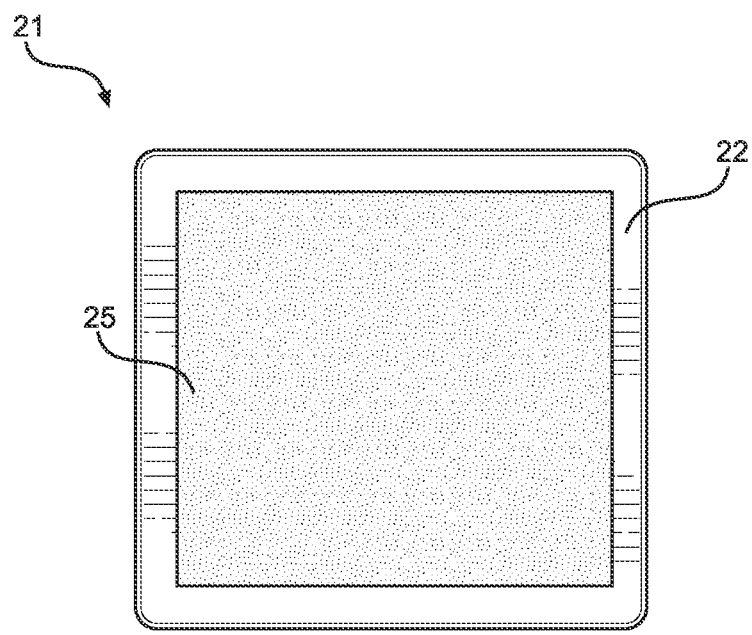
FIG. 2B shows a rear view of an embodiment of the external housing.

FIG. 2B shows a rear view of an embodiment of an external housing. The external housing 21 includes a fastener 25. The fastener 25 is disposed on the rear face of the body 22. In one embodiment, the fastener 25 comprises an adhesive surface. The adhesive surface can secure the external housing 21 to an exterior section of a vehicle.

Figure 3A:
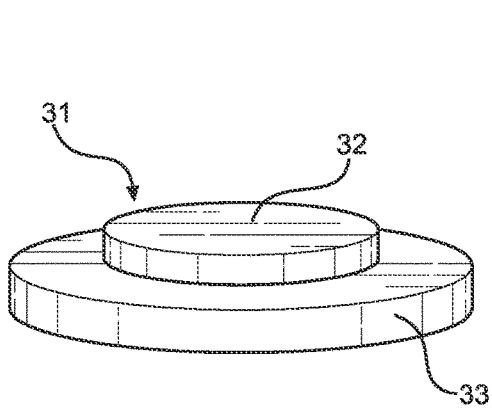
FIG. 3A shows a perspective view of an embodiment of the actuator.

FIG. 3A shows a perspective view of an embodiment of an actuator. The actuator 31 includes a body 33 and a movable body 32. The body 33 comprises a front face and a rear face. The movable body 32 extends outwardly from the front face of the body 22. The movable body 32 may engage the body 22 to activate the vehicle intercom system. In the shown embodiment, the movable body 32 is a push button.

Figure 3B:
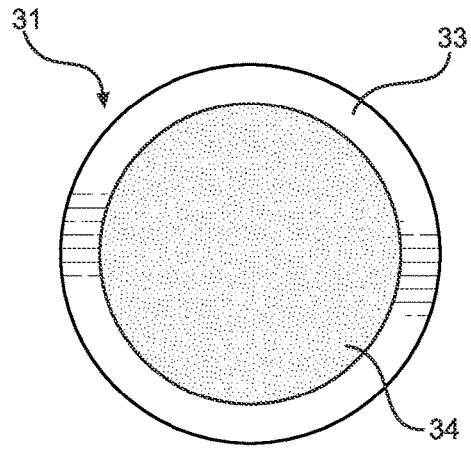
FIG. 3B shows a rear view of an embodiment of the actuator.

FIG. 3B shows a rear view of an embodiment of an actuator. The actuator 31 includes a fastener 34. The fastener 34 is disposed on the rear face of the body 33. In one embodiment, the fastener 34 comprises an adhesive surface. The adhesive surface can secure the actuator 31 to an interior section of a vehicle.

Figure 4A:
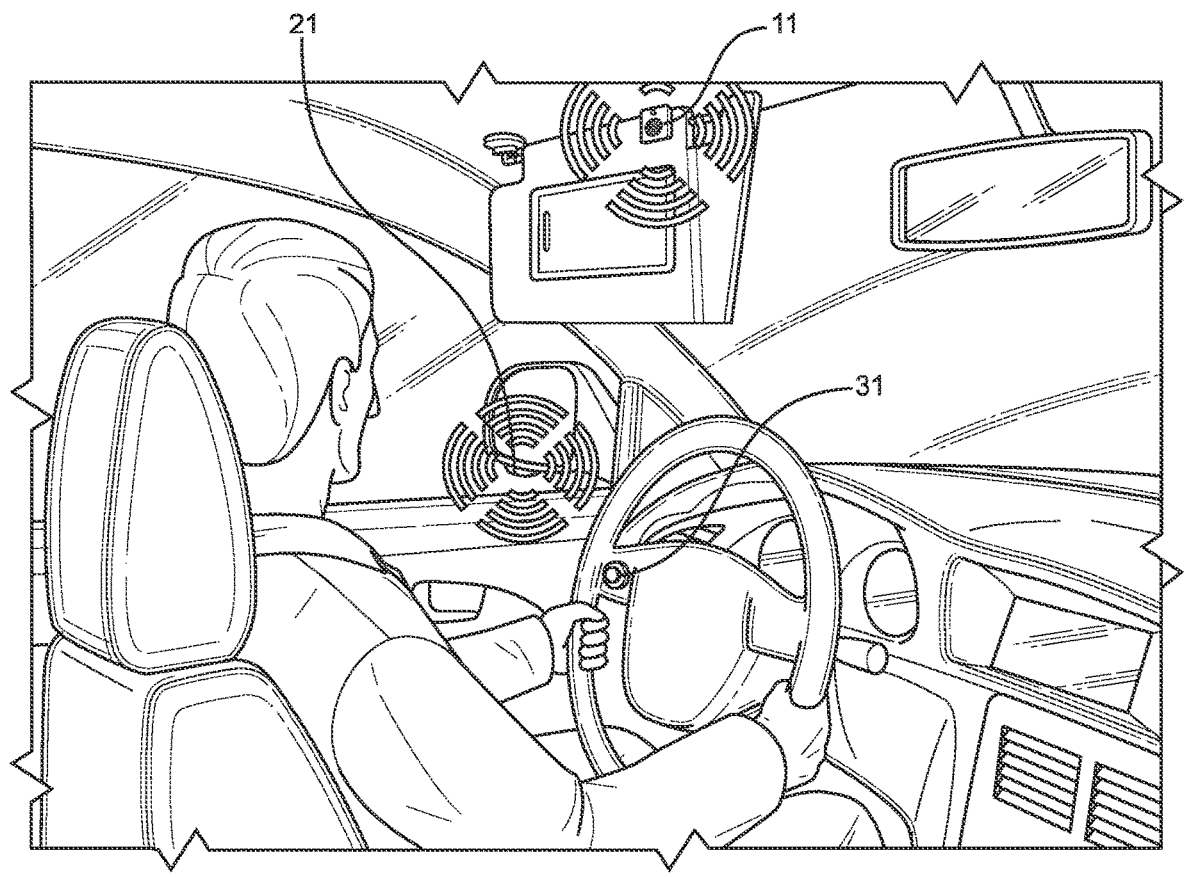
FIG. 4A shows a perspective view of an embodiment of the vehicle intercom system in use.

FIG. 4A shows a perspective view of an embodiment of a vehicle intercom system in use. The vehicle intercom system includes an internal housing 11, an external housing 21, and an actuator 31. The internal housing 11 may be secured to a sun visor within the vehicle cabin. The external housing 21 may be secured to a side view mirror on the exterior of the vehicle. The actuator 31 may be secured to any surface within the vehicle cabin. In the shown embodiment, the actuator 31 is secured to the steering wheel. The internal housing 11 and the external housing 21 are in wireless communication with the actuator 31. In use, the user will engage the actuator 31. The engagement of the actuator 31 will activate both the speaker and microphone disposed on the internal housing 11 and the speaker and microphone disposed on the external housing 21. The lighting element disposed on the internal housing 11 and the external house 21 will illuminated a light when the speaker and the microphone on each housing is activated. When activated, a channel of communication between the internal housing 11 and the external housing 21 will open. When the channel of communication is open, the user within the vehicle's cabin may speak through the microphone of the internal housing 11 and an individual outside the vehicle will hear the user in real-time through the speaker of the external housing 21. Conversely, while the channel of communication is open, the individual outside the vehicle may speak through the microphone of the external housing 21 and the user will hear the individual in real-time through the speaker of the internal housing 11. The user will then disengage the actuator 31 to close the channel of communication between the internal housing 11 and the external housing 21.

The vehicle intercom system permits the user to communicate with individuals that are outside the vehicle without rolling down the vehicle's windows or opening the vehicle's doors. This will allow users to remain inside the vehicle cabin while communicating with the individual, thus, the user will avoid exposure to outside temperature, weather, and contagious disease. In some embodiments, the system is integrated into pre-existing audio systems in the vehicle such that additional speakers and/or microphones display buttons are not required. In various embodiments, the system can communicate via a wired connection, or via a wireless connection, such as through Bluetooth.

Figure 4B:
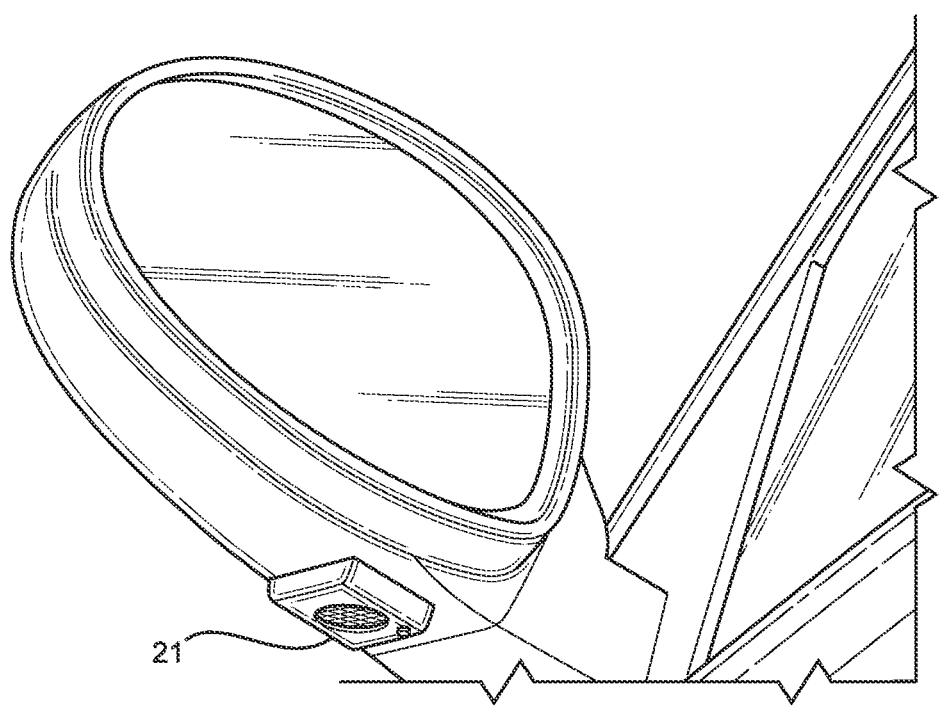
FIG. 4B shows a perspective view of an embodiment of the external housing in use.

FIG. 4B shows a perspective view of an embodiment of an external housing in use. In use, the external housing 21 will secure to the side mirror of the vehicle. In the shown embodiment, the fastener will affix the external housing 21 to a vehicle's side mirror. The fastener is an adhesive material disposed on the rear face of the external housing 21. The adhesive material will contact the surface of the side mirror. In this configuration, the speaker will be able to emit the sound from the user inside of the vehicle and allow the individual outside the vehicle to hear the emitted sound. Moreover, the individual may utilize the microphone integrated with the speaker to communicate back to the user inside the vehicle.

Figure 4C:
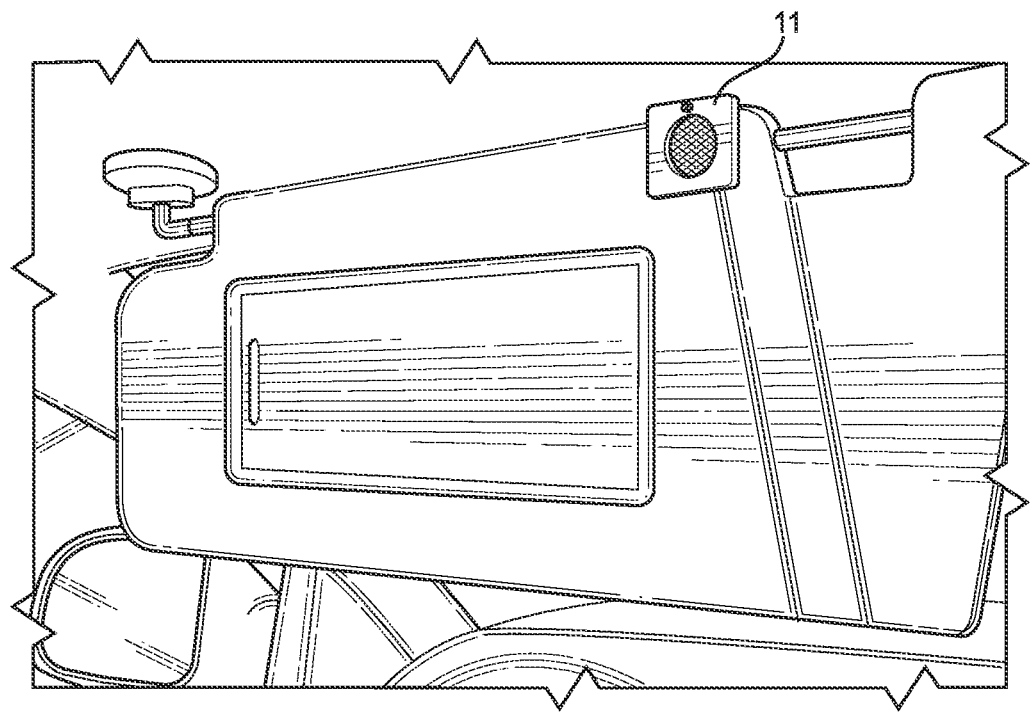
FIG. 4C shows a perspective view of an embodiment of the internal housing in use.

FIG. 4C shows a perspective view of an embodiment of an internal housing in use. In use, the internal housing 11 will secure to the sun visor of the vehicle. In the shown embodiment, the fastener will affix the internal housing 11 thereon. The fastener is a clip disposed on the rear face of the internal housing 11. The clip will engage with the edge of the sun visor. In this configuration, the speaker will be able to emit the sound from the individual outside of the vehicle and allow the user inside the vehicle cabin to hear the emitted sound. Moreover, the user may utilize the microphone integrated with the speaker to communicate back to the individual outside the vehicle.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention

I claim:

1. A vehicle intercom system, comprising:
    a plurality of housings having a first housing and a second housing; and an actuator;
    wherein each of the housings includes a front face, a rear face, and a plurality of side faces;
    wherein each of the housings includes a speaker, a microphone, and a lighting element;
    wherein each of the speakers is disposed on the front face of each of the housings respectively;
    wherein each of the lighting elements is disposed on the front face of each of the housings respectively;
    wherein each of the microphones is integrated with each of the speakers respectively;
    wherein the first housing includes a fastener;
    wherein the first housing fastener is disposed on the rear face of the first housing;
    wherein the second housing includes a fastener;
    wherein the second housing fastener is disposed on the rear face of the second housing;
    wherein the actuator includes a movable body;
    wherein the actuator includes a front face and a rear face;
    wherein the actuator is in wireless communication with the first housing and the second housing;
    wherein the actuator includes a fastener;
    wherein the actuator fastener is disposed on the rear face of the actuator;
    wherein the fastener of the first housing is a clip;
    wherein the clip extends outwardly directly from the rear face of the first housing and then extends upwardly parallel with the first housing;
    wherein the first housing is adapted to be secured to an interior object of a vehicle cabin;
    wherein the fastener of the second housing is a first adhesive surface;
    wherein the second housing is adapted to be secured to an external area of a vehicle;
    wherein the actuator movable body extends outwardly from the front face of the actuator;
    wherein the actuator movable body is selectively engaged to activate the housings and selectively disengaged to deactivate the housings;
    wherein the vehicle intercom system is adapted to allow a driver to communicate with an individual that is outside the vehicle without rolling down a window or opening a door of the vehicle; and
    wherein each of the lighting elements indicates when each of the speakers and the microphones respectively are activated.

2. The vehicle intercom system of claim 1, wherein the actuator fastener disposed on the rear face of the actuator is a second adhesive surface.

3. The vehicle intercom system of claim 1, wherein the actuator is securable to any surface within the vehicle cabin.

4. The vehicle intercom system of claim 1, wherein each of the lighting elements is a LED.

5. The vehicle intercom system of claim 1, wherein the clip engages a sun visor to secure the first housing within the vehicle cabin.

6. The vehicle intercom system of claim 5, wherein the first housing is adapted to be secured to the sun visor within the vehicle cabin.

7. The vehicle intercom system of claim 1, wherein the second housing is adapted to be secured to a side view mirror of the vehicle.

8. The vehicle intercom system of claim 7, wherein the first adhesive surface is adapted to be secured to the second housing to the side view mirror of the exterior section of the vehicle.

9. The vehicle intercom system of claim 1, wherein the movable body of the actuator is a push button.

10. The vehicle intercom system of claim 1, wherein the actuator is adapted to be secured to a steering wheel of the vehicle.

* * * * *